(12) United States Patent
Hashimoto et al.

(10) Patent No.: US 7,131,106 B2
(45) Date of Patent: Oct. 31, 2006

(54) INTEGRATED CIRCUIT PATTERN DESIGNING METHOD, EXPOSURE MASK MANUFACTURING METHOD, EXPOSURE MASK, AND INTEGRATED CIRCUIT DEVICE MANUFACTURING METHOD

(75) Inventors: Koji Hashimoto, Yokohama (JP); Shingo Tokutome, Tokyo (JP); Shigeki Nojima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 10/702,535

(22) Filed: Nov. 7, 2003

(65) Prior Publication Data

US 2004/0139414 A1 Jul. 15, 2004

(30) Foreign Application Priority Data

Nov. 8, 2002 (JP) ............................. 2002-325478

(51) Int. Cl.
 *G06F 17/50* (2006.01)
(52) U.S. Cl. .......................................... 716/21; 716/19
(58) Field of Classification Search .................. 716/21, 716/19
See application file for complete search history.

(56) References Cited

U.S. PATENT DOCUMENTS

| 6,334,209 | B1 | 12/2001 | Hashimoto et al. ............ 716/21 |
| 6,578,188 | B1* | 6/2003 | Pang et al. .................... 716/19 |
| 6,757,645 | B1* | 6/2004 | Chang et al. .................. 703/13 |

FOREIGN PATENT DOCUMENTS

| JP | 07-175204 | 7/1995 |
| JP | 09304913 A * | 11/1997 |
| JP | 2000-81697 | 3/2000 |
| JP | 2002-072440 | 3/2002 |
| JP | 2002-131882 | 5/2002 |

OTHER PUBLICATIONS

Imai et al.,"A New Filtering Method to Extract Repeated Defects (FIMER)", Jun. 1999, 4th International Work Statistical Metrology (IWSM), paper digest, pp. 22-25.*
Kotani et al.; "Method of Setting Process Parameter and Method of Setting Process Parameter and/or Design Rule"; U.S. Appl. No. 10/385,628, filed Mar. 12, 2003.
Notification of Reasons for Rejection issued by the Japanese Patent Office for Japanese Patent Application Serial No. 2002-325478, and English translation thereof.

* cited by examiner

*Primary Examiner*—Sun James Lin
(74) *Attorney, Agent, or Firm*—Finnegan, Henderson, Farabow, Garrett & Dunner, L.L.P.

(57) ABSTRACT

There is disclosed a method of designing a pattern of an integrated circuit comprising calculating the window of lithography process on a substrate, the window being calculated at least in partial data of first design data for designing the circuit pattern of integrated circuit, and the window being also calculated in consideration of a specification value of an exposure mask for use in transfer of the circuit pattern, comparing the calculated window of lithography process and the window of lithography process actually required, revising the partial data when the calculated window is smaller than the actually required window, the partial data being revised such that the window of lithography process on the substrate is equal to or larger than the actually required window, and preparing second design data, the second design data being prepared by updating the first design data by using the revised partial data.

18 Claims, 6 Drawing Sheets

INTEGRATED CIRCUIT PATTERN DESIGNING METHOD, EXPOSURE MASK MANUFACTURING METHOD, EXPOSURE MASK, AND INTEGRATED CIRCUIT DEVICE MANUFACTURING METHOD

CROSS-REFERENCE TO RELATED APPLICATIONS

This application is based upon and claims the benefit of priority from the prior Japanese Patent Application No. 2002-325478, filed Nov. 8, 2002, the entire contents of which are incorporated herein by reference.

BACKGROUND OF THE INVENTION

1. Field of the Invention

The present invention relates to a lithography process, and more particularly to a method of designing a pattern of an integrated circuit capable of enhancing the yield of a wafer or mask in lithography process narrow in window, a method of manufacturing an exposure mask, an exposure mask applicable in lithography process narrow in window, and a method of manufacturing an integrated circuit device.

2. Description of the Related Art

As the integrated circuit is more and more reduced in size recently, it is required to form a pattern of an integrated circuit of shorter design dimension than the wavelength of exposure light when transferring the pattern, on a wafer at a high precision. For example, from the generation of pattern design dimension of 110 nm, ArF excimer laser (wavelength: $\lambda=193$ nm) is introduced. As a result, this ArF lithography process is executed in about a half size of the wavelength of exposure light. That is, the preliminary condition is the process of forming an integrated circuit in the environment of narrow margin (window) in the lithography process. As the necessity for this narrow lithographic margin process increases, fluctuations of a specification value of an exposure mask are causing greater effects on the lithography process.

BRIEF SUMMARY OF THE INVENTION

According to an aspect of the invention, there is provided a method of designing a pattern of an integrated circuit comprising: calculating the window of lithography process on a substrate to be processed; the window being calculated at least in partial data of first design data for designing the circuit pattern of the integrated circuit, and the window being also calculated in consideration of a specification value of an exposure mask for use in transfer of the circuit pattern; comparing the calculated window of lithography process and the window of lithography process actually required on the substrate to be processed; revising the partial data when the calculated window of lithography process is determined to be smaller than the actually required window of lithography process; the partial data being revised such that the window of lithography process on the substrate is equal to or larger than the actually required window of lithography process; and preparing second design data; the second design data being prepared by updating the first design data by using the revised partial data.

According to an another aspect of the invention, there is provided a method of manufacturing an exposure mask comprising: calculating the window of lithography process on a substrate to be processed; the window being calculated at least in partial data of design data for designing a circuit pattern of an integrated circuit, and the window being also calculated in consideration of first specification values of an exposure mask for use in transfer of the circuit pattern; comparing the calculated window of lithography process and the window of lithography process actually required on the substrate to be processed; when the calculated window of lithography process is determined to be smaller than the actually required window of lithography process, changing a specification value out of the first specification values lowering the calculated window of lithography process smaller than the actually required window of lithography process; the specification value being revised to such that the window of lithography process on the substrate to be processed is equal to or larger than the actually required window of lithography process; setting second specification values; the second specification values being set by updating the first specification values by using the changed specification value; and forming a mask pattern for transferring the circuit pattern on the exposure mask; the mask pattern being formed on the basis of the second specification values.

According to still another aspect of the invention, there is provided an exposure mask comprising: a mask pattern of a circuit pattern of an integrated circuit designed by a method of designing a pattern of an integrated circuit, formed on the exposure mask; the method of designing a pattern of an integrated circuit, comprising: calculating the window of lithography process on a substrate to be processed; the window being calculated at least in partial data of first design data for designing the circuit pattern of the integrated circuit, and the window being also calculated in consideration of a specification value of an exposure mask for use in transfer of the circuit pattern; comparing the calculated window of lithography process and the window of lithography process actually required on the substrate to be processed; revising the partial data when the calculated window of lithography process is determined to be smaller than the actually required window of lithography process; the partial data being revised such that the window of lithography process on the substrate to be processed is equal to or larger than the actually required window of lithography process; and preparing second design data; the second design data being prepared by updating the first design data by using the revised partial data.

According to still another aspect of the invention, there is provided an exposure mask comprising: a mask pattern being formed by a method of manufacturing an exposure mask; the method of manufacturing an exposure mask, comprising: calculating the window of lithography process on a substrate to be processed; the window being calculated at least in partial data of design data for designing the circuit pattern of integrated circuit, and the window being also calculated in consideration of first specification values of an exposure mask for use in transfer of the circuit pattern; comparing the calculated window of lithography process and the window of lithography process actually required on the substrate to be processed; when the calculated window of lithography process is determined to be smaller than the actually required window of lithography process, changing a specification value out of the first specification values lowering the calculated window of lithography process smaller than the actually required window of lithography process; the specification value being revised to such that the window of lithography process on the substrate to be processed is equal to or larger than the actually required window of lithography process; setting second specification values; the second specification values being set by updating the first specification values by using the changed specification value; and forming a mask pattern for transferring the circuit pattern on the exposure mask; the mask pattern being formed on the basis of the second specification values.

According to still another aspect of the invention, there is provided a method of manufacturing an integrated circuit device comprising: a lithography process for transferring a pattern by using an exposure mask; the exposure mask having a mask pattern of a circuit pattern of an integrated circuit formed thereon, being designed by a method of designing a pattern of an integrated circuit; the method of designing a pattern of an integrated circuit, comprising: calculating the window of lithography process on a substrate to be processed; the window being calculated at least in partial data of first design data for designing the circuit pattern of integrated circuit, and the window being also calculated in consideration of a specification value of an exposure mask for use in transfer of the circuit pattern; comparing the calculated window of lithography process and the window of lithography process actually required on the substrate; revising the partial data when the calculated window of lithography process is determined to be smaller than the actually required window of lithography process; the partial data being revised such that the window of lithography process on the substrate to be processed is equal to or larger than the actually required window of lithography process; and preparing second design data; the second design data being prepared by updating the first design data by using the revised partial data.

According to still another aspect of the invention, there is provided a method of manufacturing an integrated circuit device comprising: a lithography process for transferring a pattern by using an exposure mask; the exposure mask having a mask pattern formed thereon by a method of manufacturing an exposure mask; the method of manufacturing an exposure mask, comprising: calculating the window of lithography process on a substrate to be processed; the window being calculated at least in partial data of design data for designing the circuit pattern of the integrated circuit, and the window being also calculated in consideration of first specification values of an exposure mask for use in transfer of the circuit pattern; comparing the window of lithography process being calculated and the window of lithography process actually required on the substrate; when the calculated window of lithography process is determined to be smaller than the actually required window of lithography process, changing a specification value out of the first specification values lowering the calculated window of lithography process smaller than the actually required window of lithography process; the specification value being revised to such that the window of lithography process on the substrate to be processed is equal to or larger than the actually required window of lithography process; setting second specification values; the second specification values being set by updating the first specification values by using the changed specification value; and forming a mask pattern for transferring the circuit pattern on the exposure mask; the mask pattern being formed on the basis of the second specification values.

DETAILED DESCRIPTION OF THE INVENTION

The invention will be specifically described below while referring to the illustrated embodiments.

(First Embodiment)

Figure 9:
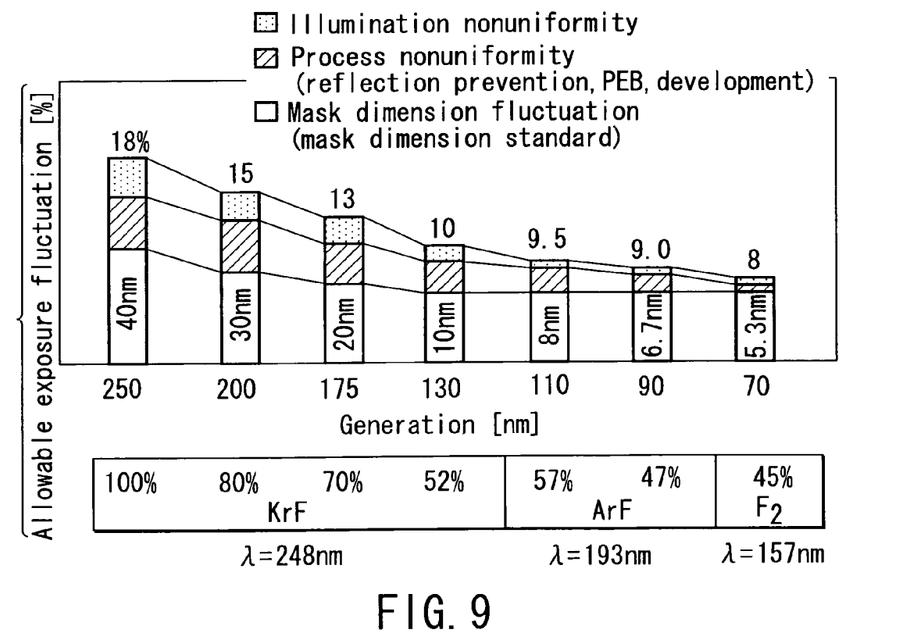
FIG. 9 is a diagram showing the correlative relation of trend of fluctuations of an allowable exposure amount in lithography process and dimension standard of an exposure mask classified by major fluctuation factors.

Prior to explanation of a first embodiment of the invention, the relation between the generation of an exposure mask and fluctuation of an allowable exposure amount in lithography process is described. FIG. 9 shows the correlative relation of trend of fluctuations of the allowable exposure amount in lithography process and dimension standard of each generation of the exposure mask as being classified by major fluctuation factors. FIG. 9 also shows the size of dimension standard (pattern dimension and design rule of integrated circuit) of each generation of the exposure mask, with respect to the wavelength of exposure light. According to FIG. 9, it is known that fluctuations of the allowable exposure amount continue to decrease along with the advancement in generation. As compared with decrease of fluctuations of the allowable exposure amount, it is found that fluctuations of mask dimension are not decreased so much. It is hence known that the occupying rate of mask dimension fluctuations among major fluctuation factors of fluctuations of the allowable exposure amount becomes higher as the integrated circuit becomes smaller in size. That is, the high precision of dimension of the exposure mask becomes more and more important as the margin of fluctuations of the allowable exposure amount becomes narrower.

Thus, in the background of narrow lithography margin process, the following two points are important for obtaining a sufficient yield in both an exposure mask manufacturing process and a wafer manufacturing process. One is to design an integrated circuit with a sufficient allowance in a specification value of the exposure mask. Other is to set at a proper mask specification value suited to an integrated circuit design pattern. In short, the mask specification value should not be set more strictly than required or more loosely than required.

Usually, the specification value of the exposure mask composed of a plurality of items is determined in each generation (design rule). An exposure mask failing to satisfy any one of the specification values is rejected. Table 1 shows an example of representative specification items of an exposure mask of 0.1 μm generation and specification values of each item. The exposure mask in this example is a so-called halftone phase shift mask.

TABLE 1

| Item | Specification value |
|---|---|
| Deviation of pattern dimension average from target dimension | ±10 nm or less |
| In-plane uniformity of pattern dimension | 8 nm (3σ) or less |
| Linearity of pattern dimension | ±20 nm or less |
| Pattern position residual error | 20 nm (3σ) or less |
| Pattern dimension magnification error | 0.2 ppm or less |
| Pattern position orthogonality error | 0.2 ppm or less |
| Defect | Free from defect of 150 nm or more |
| Deviation of transmissivity average from target transmissivity | ±0.2% |
| In-plane uniformity of transmissivity | ±0.1% |
| Deviation of phase average from 180 degrees | ±3 deg. |
| In-plane uniformity of phase | ±1.5 deg. |

Table 1 shows that 11 items are specification values for the exposure mask of the same generation (same design rule). Specification values of these 11 items are determined by the values specified in Table 1, regardless of the design pattern of the integrated circuit or process (layer). In such setting of mask specification values, it may be forced to manufacture the exposure mask in stricter standard than required depending on the design pattern. In such a case, the yield of the exposure mask manufacturing process may be lowered and the cost of manufacturing the exposure mask may be increased. As a result, the cost of manufacturing the integrated circuit device may be increased. In such setting of mask specification values, still worse, the substantially required mask specification values may not be satisfied depending on the design pattern. In this case, the yield of the wafer manufacturing process may be lowered and the cost of manufacturing the integrated circuit device may be increased.

The first embodiment of the invention is devised to solve the problems explained above. That is, it is an object of the first embodiment to provide a method of designing a pattern of an integrated circuit capable of enhancing the yield in the wafer manufacturing process even in lithography process of narrow window and decreasing the cost of manufacturing the integrated circuit device, by designing the integrated circuit pattern of appropriate precision efficiently while giving an allowance in the specification values of the exposure mask. Moreover, it can be applied in a lithography process of narrow window, and an exposure mask can be provided at low manufacturing cost and high production efficiency. It is also intended to provide a method of manufacturing an integrated circuit device, capable of producing an integrated circuit device efficiently and at low cost even in lithography process of narrow window.

Figure 1:
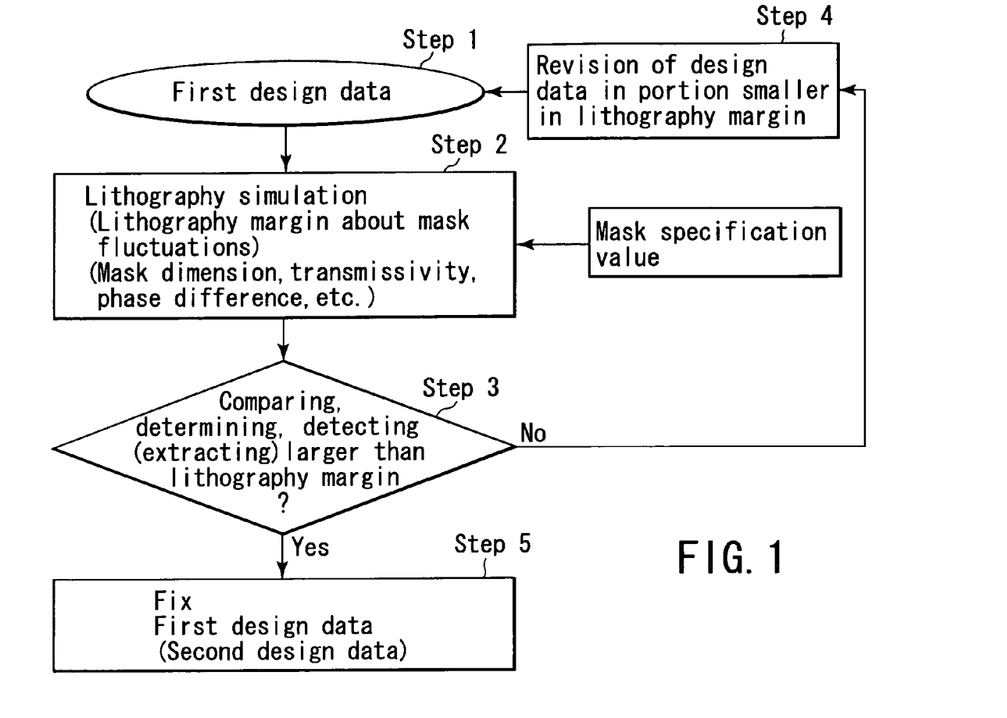
FIG. 1 is a flowchart showing a method of designing a pattern of an integrated circuit according to a first embodiment of the invention.
Figure 2:
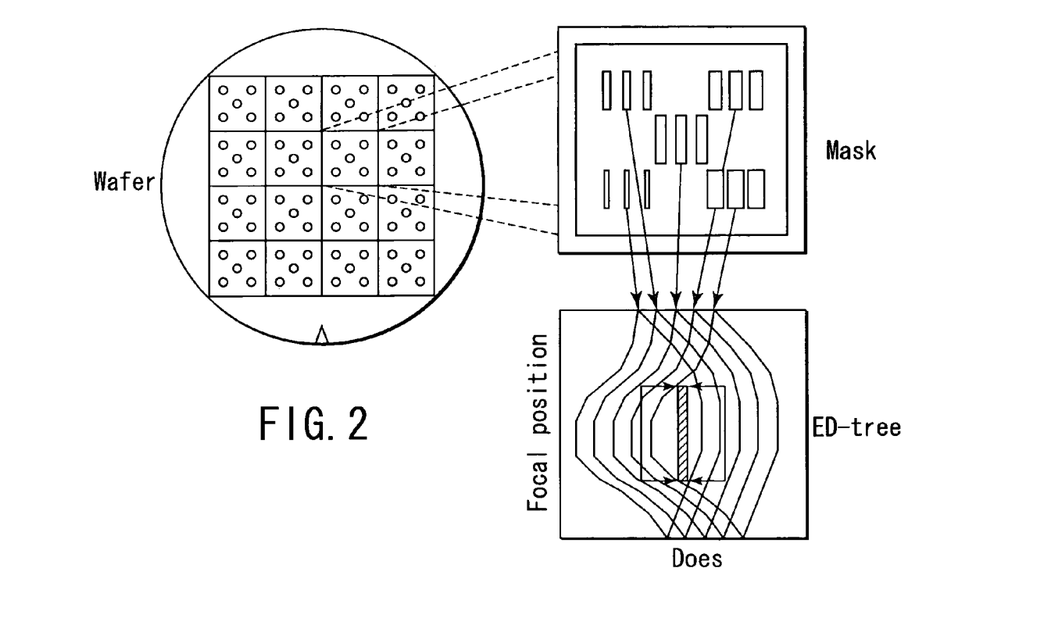
FIG. 2 is a diagram showing a simulation method for lithography process including fluctuations of a specification value of an exposure mask.
Figure 3A:
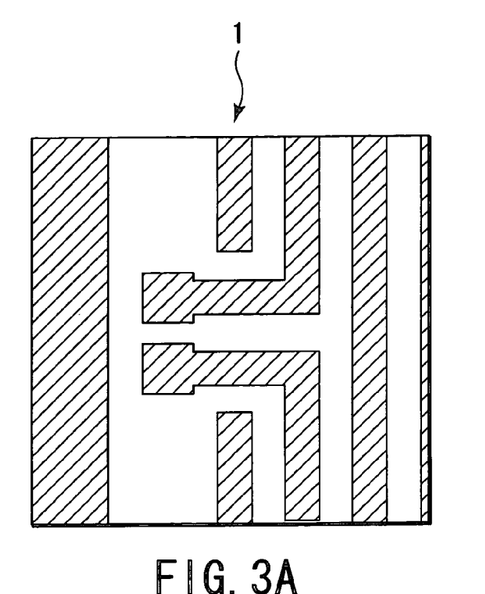
FIG. 3A is a diagram showing a design pattern of the integrated circuit before change of a design circuit.
Figure 3B:
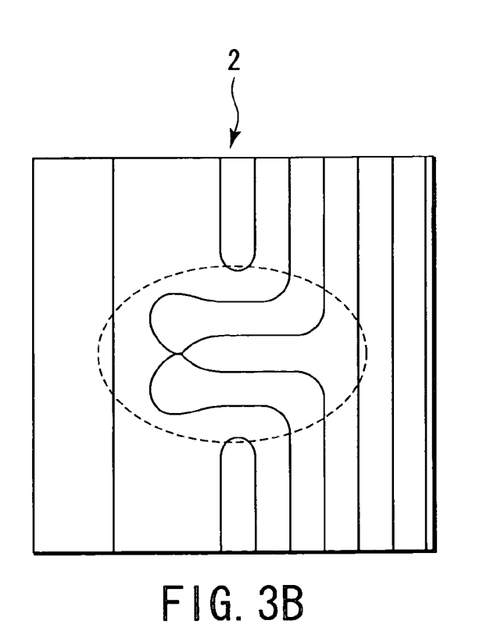
FIG. 3B is a simulation image diagram of lithography process of the design pattern shown in FIG. 3A.
Figure 4A:
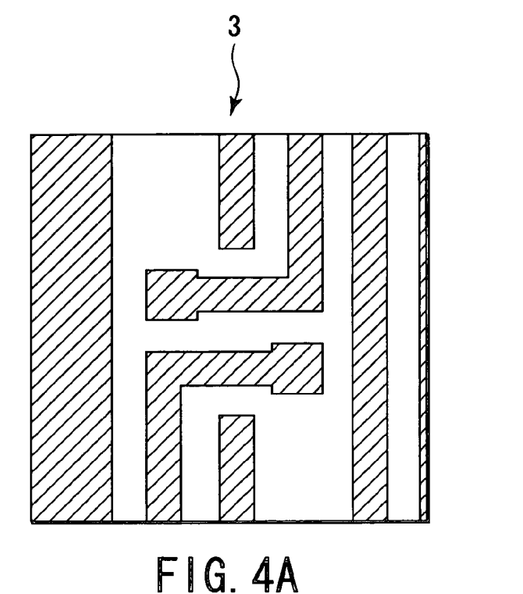
FIG. 4A is a diagram showing a design pattern of the integrated circuit after change of the design circuit.
Figure 4B:
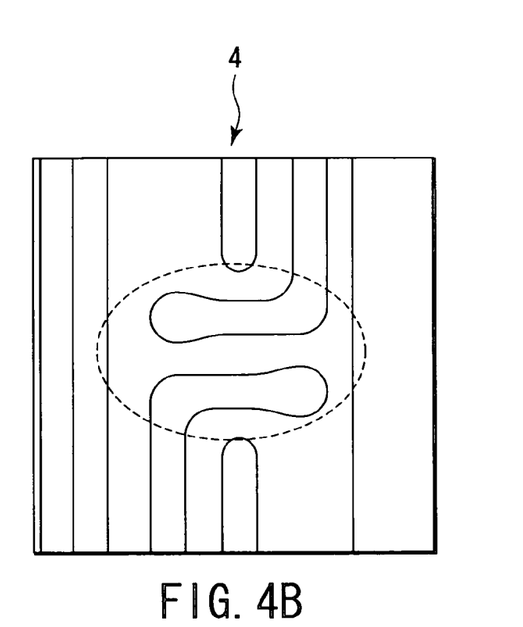
FIG. 4B is a simulation image diagram of lithography process of the design pattern shown in FIG. 4A.

First, the method of designing a pattern of an integrated circuit according to the first embodiment is explained while referring to FIGS. 1 to 4B. FIG. 1 is a flowchart showing a method of designing a pattern of an integrated circuit according to this embodiment. FIG. 2 is a diagram showing a simulation method for lithography process including fluctuations of a specification value of an exposure mask. FIG. 3A is a diagram showing a design pattern of an integrated circuit before change of a design circuit. FIG. 3B is a simulation image diagram of lithography process of the design pattern shown in FIG. 3A. FIG. 4A is a diagram showing a design pattern of the integrated circuit after change of the design circuit. FIG. 4B is a simulation image diagram of lithography process of the design pattern shown in FIG. 4A.

In the method of designing a pattern of an integrated circuit of this embodiment, of the design data for designing the circuit pattern of the integrated circuit, only the design data not satisfying the allowable condition in the lithography process is revised, and the circuit pattern is designed on the basis of new design data including the revised design data.

As shown in FIG. 1, a designer of the integrated circuit device (not shown) creates design data for designing the circuit pattern of the integrated circuit. This is called step 1. The design data created in this step 1 is supposed to be, for example, first design data.

Next, at least in partial data of the first design data, the window (margin) of lithography process on a substrate to be processed is calculated in consideration of a specification value (mask specification value) of an exposure mask used when transferring the circuit pattern of the integrated circuit. This is called step 2. In step 2, specifically, at least partial data of the first design data is simulated in consideration of an error (fluctuations) of the mask specification value of the exposure mask (not shown). This simulation is called lithography simulation hereinafter. In this embodiment, every partial data is simulated in all data of the first design data describing the circuit pattern of the integrated circuit.

At this time, fluctuations of the mask specification value of the exposure mask to be considered include the following four types: (i) relating to the dimensions of the exposure mask, (ii) relating to transmissivity of phase difference in the case of a phase shift mask used as the exposure mask, (iii) relating to mask defect of the exposure mask, and (iv) relating to a mask depicting error of the exposure mask. The mask specification values as the standard of these four kinds of fluctuations in the mask specification value are determined in each generation of the design rule of the integrated circuit device.

Specific problem (causes) of the four fluctuations of the mask specification values are as follows. (i) Relating to dimensions of the exposure mask, known examples include deviation from the target of mean (mean to nominal) of the dimension of the mask pattern (not shown) formed in the exposure mask, and fluctuations of pattern dimension in mask plane. (ii) Relating to transmissivity or phase difference of a phase shift mask, known examples include deviation from a desired value of the transmissivity of a phase shifter formed in the mask, fluctuations in mask plane. (iii) Relating to mask defect of the exposure mask, known examples include polarity of the mask defect (white defect or black defect), position of the mask defect (whether pattern center or pattern edge), and size of the mask defect. (iv) Relating to a mask depicting error of the exposure mask, known examples include frame linking (batting error) at the time of mask pattern depicting.

For example, lithography simulation is explained on the basis of (iv) fluctuations of mask specification value relating to the dimensions of the exposure mask. In this embodiment, as shown in FIG. 2, lithography simulation is executed by an evaluation method using the so-called ED-Tree is designed to vary in a direction along the amount (dose) of the exposure. The overlapping portion of the ED-Tree in the presence of fluctuations of the mask pattern dimension is smaller as compared with that in the absence of fluctuations of the mask pattern dimension. The overlapping portion of the ED-Tree in the presence of fluctuations of the mask pattern dimension is called the common window of lithography, that is, common lithography margin.

Thus, in this embodiment, by lithography simulation, as the window of lithography process, it is designed to calculate the window for the allowable values of dimensional fluctuations on the substrate (wafer) to be processed (not shown) in the lithography process. At this time, as the window for the allowable values of dimensional fluctuations on the wafer, the window of fluctuation of process in the lithography process is calculated. Specifically, as the process fluctuation, at least one of focus fluctuation and exposure fluctuation is used.

Next, the window of the lithography process calculated by lithography simulation is compared with the window of the lithography process actually required on the wafer. This is called step 3. Hereinafter, the window of the lithography process calculated by lithography simulation is simply called lithography margin. The window of the lithography process actually required on the wafer is called the required lithography margin. In step 3, specifically, it is determined whether or not the lithography margin is larger than the required lithography margin necessary for manufacturing a wafer in the standard of the generation of a desired integrated circuit device. In this embodiment, in every partial data, the lithography margin and required lithography margin are compared in all data of the first design data.

In step 3, when the value of the lithography margin is determined to be equal to or larger than the value of the required lithography margin, the circuit pattern of the integrated circuit corresponding to the partial data is determined to be designed in the necessary and sufficient lithography margin. In this case, the partial data used in the lithography simulation is fixed as the design data of a partial circuit pattern of the circuit pattern of the integrated circuit.

On the other hand, in step 3, when the value of the lithography margin is determined to be smaller than the value of the required lithography margin, the partial data is revised such that the value of the lithography margin is equal to or larger than the value of the required lithography margin. That is, the design of the circuit pattern is changed only in the partial data determined to be smaller in the value of the lithography margin than the value of the required lithography margin, out of the entire circuit pattern of the integrated circuit. This is called step 4.

Hereinafter, in all data of the first design data, in every partial data, step 1 to step 4 are repeated until the value of the lithography margin becomes same or larger than the value of the required lithography margin. As a result, the partial data of the circuit pattern smaller in the value of lithography margin than the value of the required lithography margin is eliminated from the first design data. At the same time, in all data of the first design data, in every partial data, the first design data is revised until the value of the lithography margin becomes same or larger than the value of the required lithography margin. After making sure all partial data inappropriate in the value of lithography margin in the first design data are revised, the partial data in the same locations before revision are updated by using the revised partial data. Thus, new design data for designing the circuit pattern of the integrated circuit is prepared. The new design data is called second design data.

The prepared second design data is fixed as final design data for designing the circuit pattern of the integrated circuit, and released. This is called step 5. On the basis of the released second design data, the circuit pattern of a desired integrated circuit device is designed.

In step 3, in all data of the first design data, when the value of the lithography margin is determined to be larger than the value of the required lithography margin, in step 5, the first design data is directly fixed as the final design data for designing the circuit pattern of the integrated circuit, and released. On the basis of the released first design data, the circuit pattern of a desired integrated circuit device is designed.

Meanwhile, the above-described step 1 to step 4 are not required to be executed in every partial data of the first design data. For example, step 1 to step 4 may be executed in batch in all data of the first design data. It is specifically described below.

First, in step 2, in all data of the first design data, values of the lithography margin are calculated in batch. In step 3, the lithography margin and required lithography margin are compared with each other, and it is determined whether or not the first design data includes portions of smaller value of lithography margin than the value of required lithography margin. When the first design data does not include portions of smaller value of lithography margin than the value of required lithography margin, in step 5, the first design data is directly fixed and released. On the basis of the released first design data, the circuit pattern of a desired integrated circuit device is designed.

On the other hand, if the first design data includes portions of smaller value of lithography margin than the value of required lithography margin, in step 3, the partial data corresponding to the portion of smaller value is detected (extracted and specified) from the first design data. In step 4, the detected partial data is revised until the value of the lithography margin becomes same or larger than the value of the required lithography margin. After making sure all partial data inappropriate in the value of lithography margin in the first design data are revised, the partial data before revision are updated by using the revised partial data. Thus, second design data is prepared. The prepared second design data is fixed and released in step 5. On the basis of the released second design data, the circuit pattern of a desired integrated circuit device is designed.

FIGS. 3A and 3B show an inappropriate circuit pattern (defective circuit pattern) 1 before design change by the integrated circuit pattern designing method of the embodiment, and its lithography simulation image 2. FIGS. 4A and 4B show an appropriate circuit pattern (appropriate circuit pattern) 3 after design change by the integrated circuit pattern designing method of the embodiment, and its lithography simulation image 4.

Lithography simulation is executed on the basis of the design data corresponding to the defective circuit pattern 1 shown in FIG. 3A. As a result, as shown in FIG. 3B, shorting of the circuit pattern is observed in the dotted line area of the wafer image 2 corresponding to the defective circuit pattern 1. In such a case, on the basis of the integrated circuit pattern designing method of the embodiment, the defective circuit pattern 1 is changed in design to the appropriate circuit pattern 3 as shown in FIG. 4A. Then lithography simulation is executed on the basis of the revised design data corresponding to the appropriate circuit pattern 3. As a result, as shown in FIG. 4B, shorting of the circuit pattern is eliminated in the dotted line area of the image 4 corresponding to the appropriate circuit pattern 3. Thus, according to the integrated circuit pattern designing method of the embodiment, it is possible to prevent forming of defective circuit having shorting of circuit pattern or opening of circuit pattern.

As explained herein, according to the integrated circuit pattern designing method of the embodiment, there is almost no risk of designing the circuit pattern by forcing to manufacture the wafer in a stricter standard than required by applying a strict standard uniformly on all first design data. Likewise, there is almost no risk of designing the circuit pattern not satisfying the substantially required mask specification value by applying a loose standard uniformly on all first design data. That is, the circuit pattern designed on the basis of the integrated circuit pattern designing method of the embodiment has a necessary and sufficient lithography margin. Hence there is almost no risk of lowering the yield in the wafer manufacturing process or increasing the cost of manufacturing the integrated circuit device. As a result, the integrated circuit pattern of appropriate precision can be designed efficiently while giving an allowance to the mask specification value of the exposure mask. Since the wafer on which the integrated circuit pattern is formed is prepared in a necessary and sufficient lithography margin, a high yield is obtained. Therefore, even in the lithography process of narrow window, the yield can be enhanced in the wafer manufacturing process, and the cost of manufacturing the integrated circuit device can be lowered.

The exposure mask of the embodiment (not shown) will be explained. In the exposure mask of the embodiment, a mask pattern of the circuit pattern of the integrated circuit designed by using the second design data prepared by the integrated circuit pattern designing method mentioned above is formed. That is, in this exposure mask, a mask pattern of the circuit pattern of the integrated circuit designed on the basis of the appropriate design data capable of obtaining a necessary and sufficient lithography margin is formed. As mentioned above, according to the integrated circuit pattern designing method of the embodiment, since a mask pattern having a mask specification value of appropriate precision can be formed efficiently, the yield of the exposure mask of the embodiment is enhanced, and the production efficiency is high. Therefore, the exposure mask of the embodiment can be used in the lithography process of narrow window, and the manufacturing cost is low and the production efficiency is high.

The integrated circuit device manufacturing method according to the embodiment will be described. The integrated circuit device manufacturing method of the embodiment includes the lithography process of pattern transfer by using the exposure mask of the embodiment mentioned above. That is, pattern transfer is executed by using the exposure mask having formed therein a mask pattern having a necessary and sufficient lithography margin and mask specification value of appropriate precision. As a result, by transferring an appropriate mask pattern satisfying the condition of window of lithography process, a circuit pattern of the appropriate integrated circuit can be formed efficiently. The wafer on which a circuit pattern is formed by transfer of such mask pattern is prepared in a necessary and sufficient lithography margin. Thus, the integrated circuit device formed on this wafer is enhanced in the dimensional precision of the circuit pattern, improved in the electrical performance, and enhanced in the yield. By the integrated circuit device manufacturing method of the embodiment, an integrated circuit device can be manufactured at low cost and efficiently even in the lithography process of narrow window.

(Second Embodiment)

Figure 5:
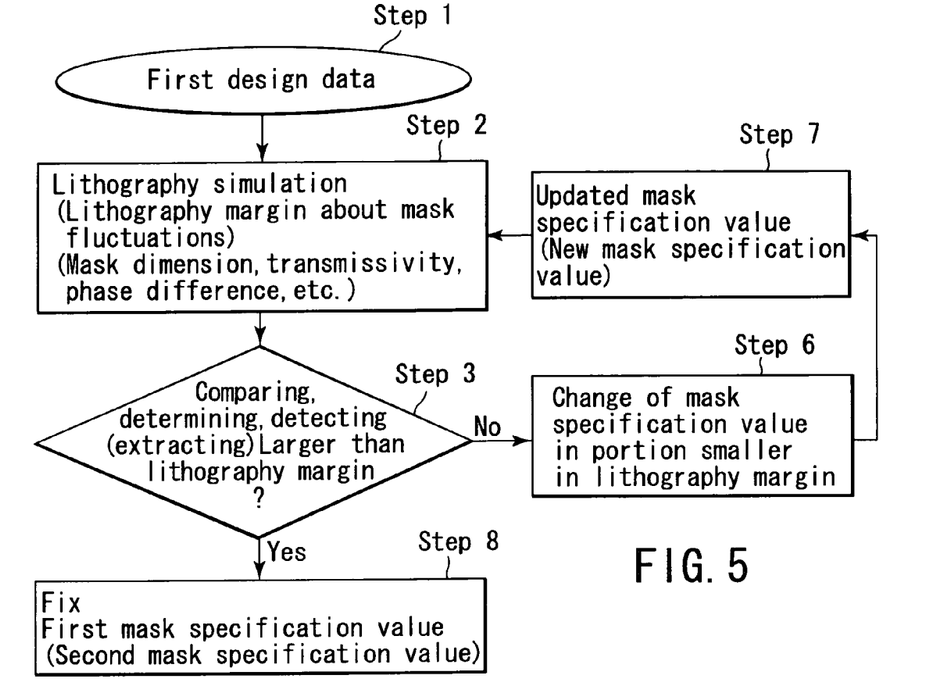
FIG. 5 is a flowchart showing a method of manufacturing an exposure mask according to a second embodiment of the invention.
Figure 6A:
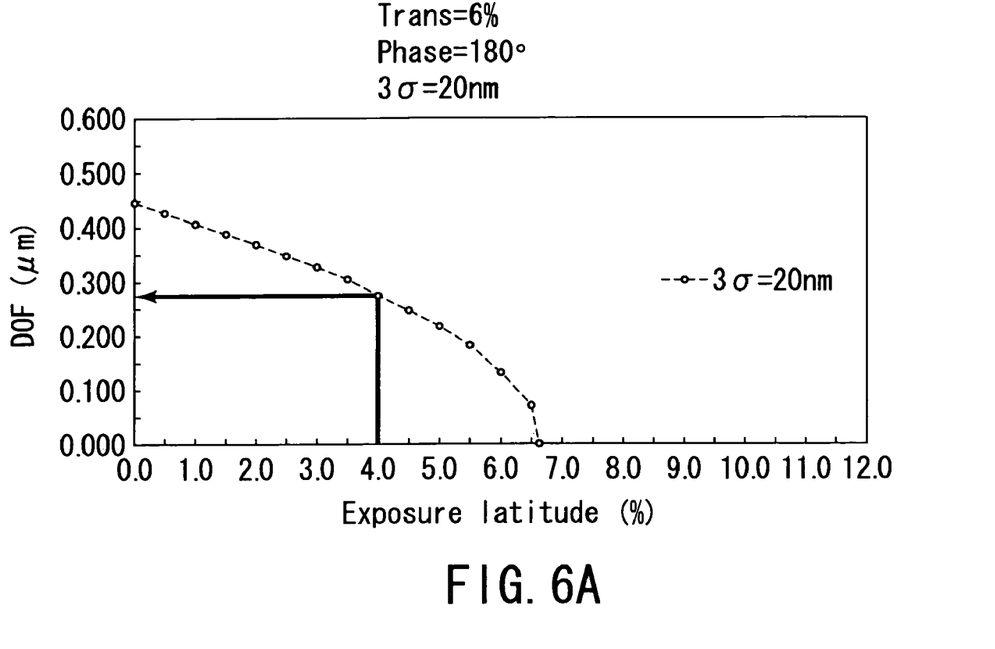
FIGS. 6A and 6B are graphs showing the simulation result of lithography process on the basis of the in-plane uniformity of a mask pattern in the method of manufacturing an exposure mask according to the second embodiment.
Figure 6B:
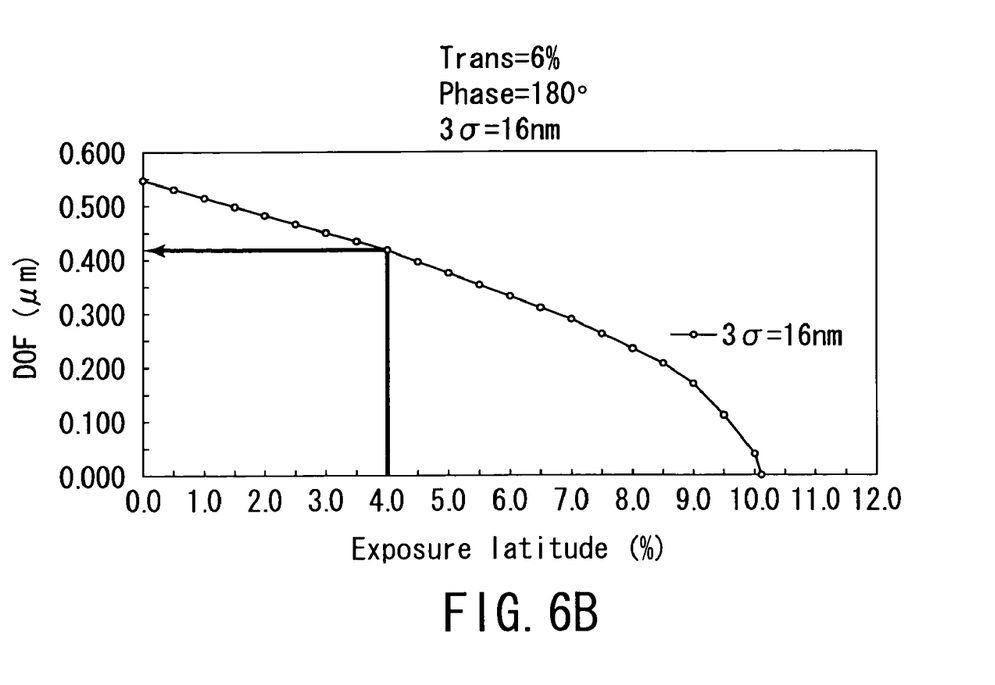
Figure 7A:
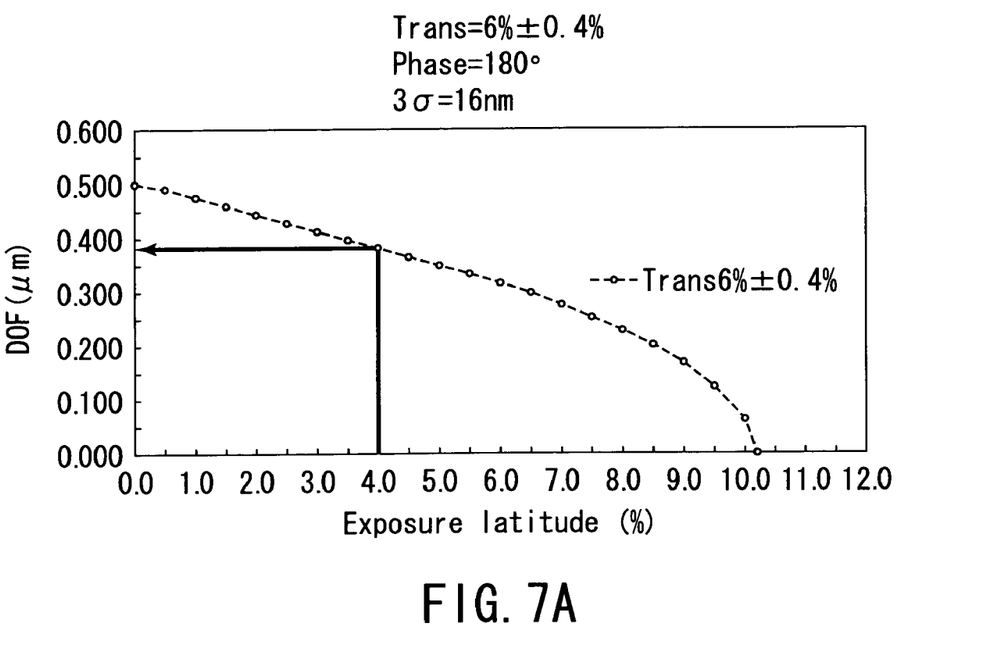
FIGS. 7A and 7B are graphs showing the simulation result of lithography process on the basis of the transmissivity of a mask pattern in the method of manufacturing an exposure mask according to the second embodiment.
Figure 7B:
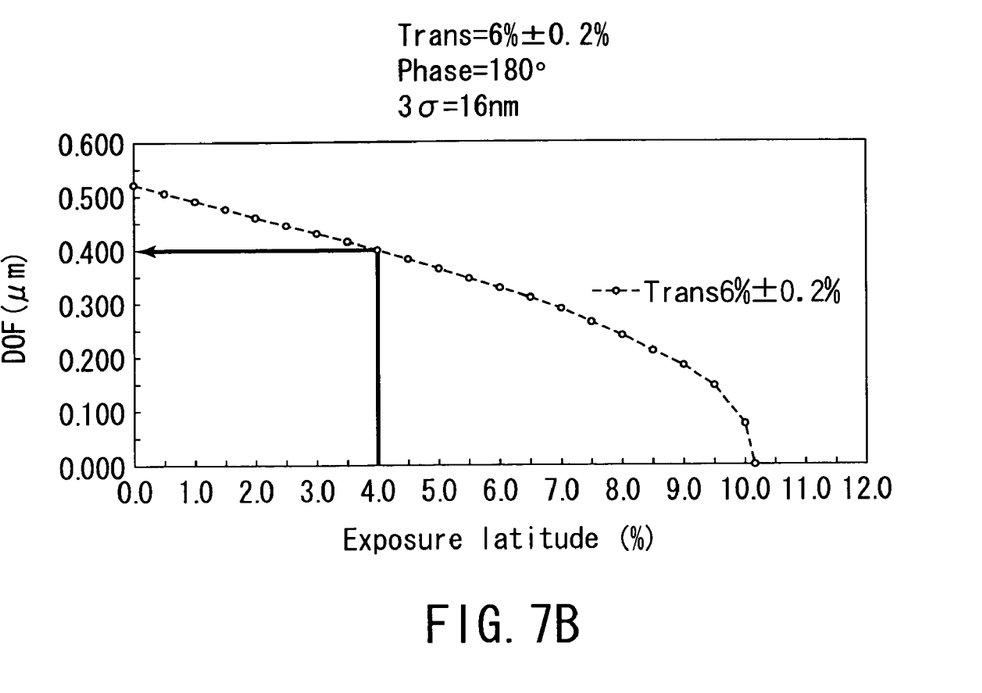
Figure 8A:
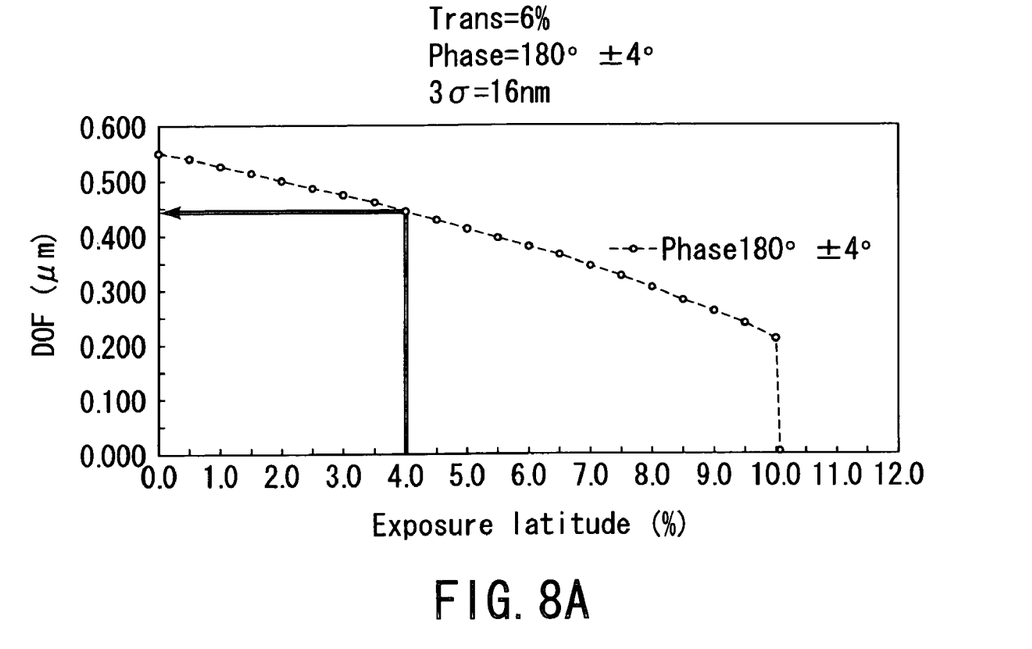
FIGS. 8A and 8B are graphs showing the simulation result of lithography process on the basis of the phase difference of a mask pattern in the method of manufacturing an exposure mask according to the second embodiment.
Figure 8B:
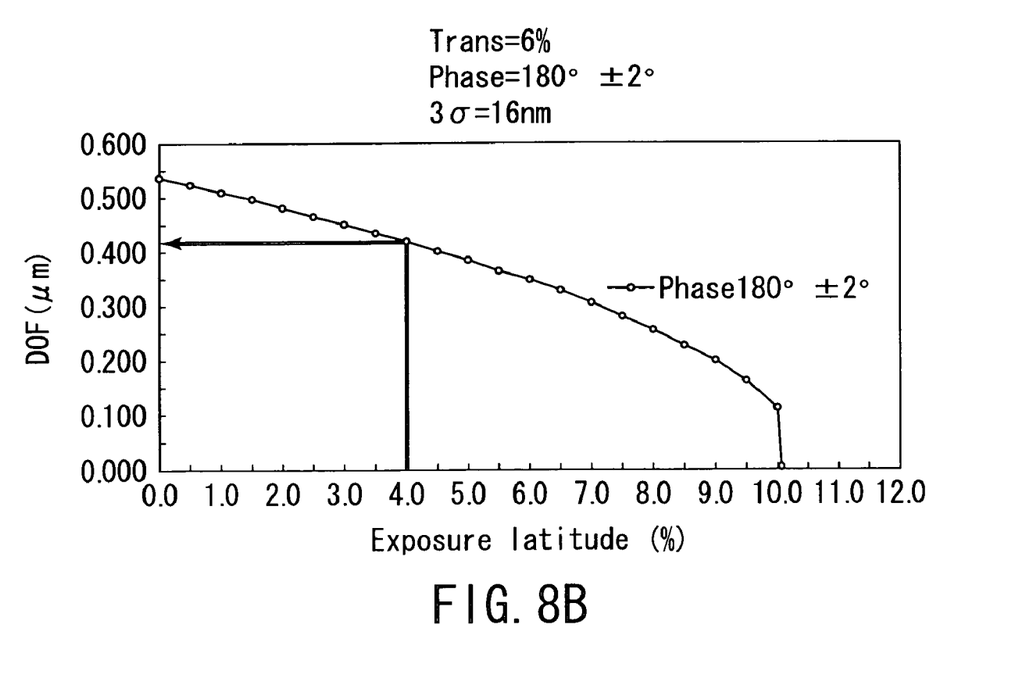

A second embodiment of the invention will be described below while referring to FIGS. 5 to 8B. FIG. 5 is a flowchart showing a method of fabrication an exposure mask according to the second embodiment. FIGS. 6A and 6B are graphs showing the simulation result of lithography process on the basis of the in-plane uniformity of the mask pattern in the exposure mask manufacturing method of the embodiment. FIGS. 7A and 7B are graphs showing the simulation result of lithography process on the basis of the transmissivity of the mask pattern in the exposure mask manufacturing method of the embodiment. FIGS. 8A and 8B are graphs showing the simulation result of lithography process on the basis of the phase difference of the mask pattern in the exposure mask manufacturing method of the embodiment. Same parts as in the first embodiment are identified with same reference numerals and detailed description is omitted.

In the embodiment, of the mask specification values for forming a mask pattern for transferring the circuit pattern of the integrated circuit on an exposure mask, only the mask specification values not satisfying the condition of window of lithography are changed, and the mask pattern is formed on the exposure mask on the basis of the mask specification values including the changed mask specification values, and this method of manufacturing an exposure mask is mainly described below.

Step 1 to step 3 are same as in the first embodiment, and the explanation is omitted. However, lithography simulation is executed on all data of the first design data in every partial data of the first design data while considering the first mask specification values of the exposure mask.

In step 3, when the value of the lithography margin is determined to be equal to or larger than the value of the required lithography margin, it is determined that the first mask specification values of the exposure mask to be considered satisfy the necessary and sufficient lithography margin. That is, fluctuations of mask specification values of (i) to (iv) mentioned above are determined to settle within an appropriate range. In this case, the first mask specification values corresponding to the partial data used in the lithography simulation out of the first design data are fixed as the design data of the mask pattern for transferring the circuit pattern of the integrated circuit.

On the other hand, in step 3, if the value of the lithography margin is determined to be smaller than the value of the required lithography margin, of the fluctuations of mask specification values of (i) to (iv) mentioned above, the element (mask specification value) as the cause of shortage of lithography margin is detected (extracted and specified) from the result of lithography simulation. The detected mask specification value out of the first mask specification values is changed such that the value of the lithography margin becomes same or larger than the value of the required lithography margin. That is, only the pattern portion determined to be smaller in the value of the lithography margin than the value of the required lithography margin is changed in the design of the mask pattern. This is called step 6.

Using the mask specification value changed in step 6, the mask specification value of the same content before change is updated, and a new mask specification value is prepared. This is called step 7.

Hereinafter, while considering a new mask specification value created in step 7 in every partial data, step 2, step 3, step 6, and step 7 are repeated on all data of the first design data until the value of the lithography margin becomes same or larger than the value of the required lithography margin. As a result, the mask specification value smaller in the value of the lithography margin than the value of the required lithography margin is eliminated from the first mask specification values. At the same time, on all data of the first design data, each mask specification value of the first mask specification values is changed in every partial data until the value of the lithography margin becomes same or larger than the value of the required lithography margin. After making sure all mask specification values inappropriate in the value of lithography margin in the first mask specification data are changed, in step 7, the mask specification values of the same contents before change are updated by using the changed mask specification values. Thus, new mask specification values are prepared for forming the mask pattern for transferring the circuit pattern of the integrated circuit on a semiconductor substrate or the like (not shown). The new mask specification values are called second mask specification values.

The prepared second mask specification values are fixed as final mask specification values for forming a mask pattern on the exposure mask, and released. This is called step 8. On the basis of the released second mask specification values, a desired mask pattern having a necessary and sufficient lithography margin is formed on the exposure mask. As a result, a desired exposure mask having an appropriate optical performance is manufactured.

In step 3, in all data of the first design data, suppose the value of the lithography margin is determined to be larger than the value of the required lithography margin. That is, in all data of the first design data, when the first mask specification values are determined to satisfy the necessary and sufficient lithography margin, in step 8, the first mask specification value are directly fixed as the final mask specification values for forming the mask pattern, and released. On the basis of the released first mask specification values, a desired mask pattern is formed on the exposure mask.

Meanwhile, step 2, step 3, step 6, and step 7 are not required to be executed in every partial data of the first design data. For example, step 2, step 3, step 6, and step 7 may be executed in batch in all data of the first design data. It is specifically described below.

First, in step 2, in all data of the first design data, values of the lithography margin are calculated in batch while considering the first mask specification values. In step 3, the lithography margin and required lithography margin are compared, and it is determined whether the first mask specification values include mask specification values of smaller value of lithography margin than the value of required lithography margin. When the first mask specification values do not include portions of smaller value of lithography margin than the value of required lithography margin, in step 8, the first mask specification values are directly fixed and released. On the basis of the released first mask specification values, the mask pattern is formed on the exposure mask.

On the other hand, if the first mask specification values include mask specification values of smaller value of lithography margin than the value of required lithography margin, in step 3, the mask specification values corresponding to the portion of smaller value are detected (extracted and specified) from the first mask specification values. In step 6, the detected mask specification values are changed until the value of the lithography margin becomes same or larger than the value of the required lithography margin. After making sure all mask specification values inappropriate in the value of lithography margin in the first mask specification value are changed, in step 7, the mask specification values before change are updated by using the changed mask specification values. Thus, second mask specification values are prepared. The prepared second mask specification values are fixed and released in step 8. On the basis of the released second mask specification values, a desired mask pattern is formed on the exposure mask.

Specific factors (causes) of fluctuations of the first and second mask specification values of the exposure mask are the same as fluctuations of the mask specification values of (i) to (iv) in the first embodiment. Also in this embodiment, by lithography simulation, as the window of lithography process, it is designed to calculate the window for the allowable values of dimensional fluctuations on the substrate (wafer) to be processed (not shown) in the lithography process. At this time, as the window for the allowable values of dimensional fluctuations on the wafer, the window of fluctuation of process in the lithography process is calculated. Specifically, as the process fluctuation, at least one of focus fluctuation and exposure fluctuation is used.

FIGS. 6A and 6B graphically show the result of lithography simulation of the embodiment, in the case of setting of two mask specification values for in-plane uniformity of the mask pattern, in design data of a predetermined circuit pattern (not shown). In this case, the mask specification values for in-plane uniformity of the mask pattern are set at two values, $3\sigma=20$ nm and $3\sigma=16$ nm. The mask specification value of the transmissivity (Trans) of the mask pattern is set at 6%. The mask specification value of phase difference (Phase) of the mask pattern is set at 180°.

As known from FIGS. 6A and 6B, at the required lithography margin of EL (exposure latitude)=4.0%, in the case of depth of focus (DOF)=0.4 µm in consideration of fluctuations of the mask specification values, in the mask parameter of $3\sigma=20$ nm, the value of lithography margin does not reach a required value. That is, the value of lithography margin does not reach 4.0%. On the other hand, at the required lithography margin of EL=4.0%, in the case of depth of focus of DOF=0.4 µm in consideration of fluctuations of the mask specification values, in the mask parameter of $3\sigma=16$ nm, the value of lithography margin reaches the required value. That is, the value of lithography margin reaches 4.0%. As known from these results, in the mask manufacturing method of the embodiment, it is a necessary and sufficient condition to define the in-plane uniformity of the mask pattern within $3\sigma=16$ nm.

FIGS. 7A and 7B graphically show the result of lithography simulation of the embodiment, in the case of setting of two mask specification values for transmissivity of the mask pattern, in design data of a predetermined circuit pattern (not shown). In this case, the mask specification values for transmissivity of the mask pattern are set in two ranges, 6%±0.4% and 6%±0.2%. The mask specification value of in-plane uniformity of the mask pattern is set at $3\sigma=16$ nm. The mask specification value of phase difference is set at 180°.

As known from FIGS. 7A and 7B, at the required lithography margin of EL=4.0%, in the case of depth of focus of DOF=0.4 μm in consideration of fluctuations of the mask specification values, in the mask parameter of 6%±0.4%, the value of lithography margin does not reach 4.0%. On the other hand, at the required lithography margin of EL=4.0%, in the case of depth of focus of DOF=0.4 μm in consideration of fluctuations of the mask specification values, in the mask parameter of 6%±0.2%, the value of lithography margin reaches 4.0%. As known from these results, in the mask manufacturing method of the embodiment, it is a necessary and sufficient condition to define the transmissivity of the mask pattern within 6%±0.2%.

FIGS. 8A and 8B graphically show the result of lithography simulation of the embodiment, in the case of setting of two mask specification values for phase difference of the mask pattern, in design data of a predetermined circuit pattern (not shown). In this case, the mask specification values for phase difference of the mask pattern are set in two ranges, 180°±4° and 180°±2°. The mask specification value of transmissivity of the mask pattern is set at 6%. The mask specification value of in-plane uniformity of the mask pattern is set at 3σ=16 nm.

As known from FIGS. 8A and 8B, at the required lithography margin of EL=4.0%, in the case of depth of focus of DOF=0.4 μm in consideration of fluctuations of the mask specification values, in the mask parameter of 180°±2°, the value of lithography margin reaches 4.0%. On the other hand, at the required lithography margin of EL=4.0%, in the case of depth of focus of DOF=0.4 μm in consideration of fluctuations of the mask specification values, in the mask parameter of 180°±4°, too, the value of lithography margin reaches 4.0%. As known from these results, in the mask manufacturing method of the embodiment, it is a sufficient condition to define the phase difference of the mask pattern within 180°±4°. In other words, it is not required to set the phase difference of the mask pattern in a stricter specification of 180°±2°, and it is enough to set the specification value within 180°±4° having less load on the exposure mask.

As described herein, according to the exposure mask manufacturing method of the embodiment, there is almost no risk of forcing to fabricate the mask pattern in stricter mask standard values than required by applying strict mask specification values uniformly on all first mask specification values of the exposure mask. Likewise, there is almost no risk of manufacturing the mask pattern not satisfying the substantially required mask specification values by applying loose mask specification values uniformly on all first mask specification values. That is, the mask pattern manufactured according to the exposure mask manufacturing method of the embodiment has a necessary and sufficient lithography margin. Hence there is almost no risk of lowering the yield in the exposure mask manufacturing process or increasing the cost of manufacturing the exposure mask. As a result, the mask pattern having appropriate precise mask specification values suited to the design pattern of the integrated circuit can be designed efficiently. Therefore, even in the lithography process of narrow window, the yield can be enhanced in the exposure mask manufacturing process, and the cost of manufacturing the exposure mask can be lowered.

The exposure mask of the embodiment (not shown) will be briefly described. In the exposure mask of the embodiment, a mask pattern of the circuit pattern of the integrated circuit is formed in consideration of the second mask specification values manufactured by the exposure mask manufacturing method mentioned above. That is, in this exposure mask, a mask pattern of the circuit pattern of the integrated circuit designed on the basis of the appropriate design data capable of obtaining a necessary and sufficient lithography margin is formed. As mentioned above, according to the exposure mask manufacturing method of the embodiment, since a mask pattern having a mask specification value of appropriate precision can be formed efficiently, the yield of the exposure mask of the embodiment is enhanced, and the production efficiency is high. Therefore, the exposure mask of the embodiment can be used in the lithography process of narrow window, and the manufacturing cost is low and the production efficiency is high.

The integrated circuit device manufacturing method of the embodiment will be described. The integrated circuit device manufacturing method of the embodiment includes the lithography process of pattern transfer by using the exposure mask of the embodiment mentioned above. That is, pattern transfer is executed by using the exposure mask having formed therein a mask pattern having a necessary and sufficient lithography margin and mask specification value of appropriate precision. As a result, by transferring an appropriate mask pattern satisfying the condition of window of lithography process, a circuit pattern of the appropriate integrated circuit can be formed efficiently. The wafer on which a circuit pattern is formed by transfer of such mask pattern is prepared in a necessary and sufficient lithography margin. Thus, the integrated circuit device formed on this wafer is enhanced in the dimensional precision of the circuit pattern, improved in the electrical performance, and enhanced in the yield. By the integrated circuit device manufacturing method of the embodiment, therefore, an integrated circuit device can be manufactured at low cost and efficiently even in the lithography process of narrow window.

It must be noted, however, that the integrated circuit pattern designing method, exposure mask manufacturing method, exposure mask, and integrated circuit device manufacturing method of the invention are not limited to the first and second embodiments described herein. Within the scope not departing from the true spirit of the invention, the configurations or processes may be partly changed or modified, or various settings may be properly combined, and the invention may be realized in various different manners.

For example, the integrated circuit pattern designing method of the first embodiment and the exposure mask manufacturing method of the second embodiment may be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of designing a circuit pattern of an integrated circuit comprising the following steps:

calculating a window of lithography process on a substrate to be processed, the window being calculated at least in a partial data of a first design data for designing the circuit pattern of the integrated circuit, and the window also being calculated in consideration of physical specification values of an exposure mask for use in transfer of the circuit pattern;

comparing the calculated window of lithography process and an actually required window of lithography process on the substrate to be processed;

revising the partial data in response to said comparing and the calculated window of lithography process being smaller than the actually required window of lithography process, the partial data being revised such that a window of lithography process on the substrate, which is calculated based on the revised partial data, is equal to or larger than the actually required window of lithography process; and preparing a second design data, wherein the second design data is prepared by updating the first design data by using the revised partial data.

2. The method according to claim 1, wherein the operation from the step of calculating the window of lithography process on the substrate to be processed to the step of revising the partial data is executed on all data in the first design data.

3. The method according to claim 1, wherein the step of calculating the window of lithography process on the substrate to be processed and the step of comparing the calculated window of lithography process and the actually required window of lithography process on the substrate to be processed are executed in batch on all data in the first design data, if the batch calculated window of lithography process includes a portion smaller than the required window of lithography process, the partial data corresponding to this portion is detected from the first design data, and the partial data is revised such that the window of lithography process on the substrate to be processed being calculated with respect to the detected partial data is equal to or larger than the actually required window of lithography process.

4. The method according to claim 1, wherein the physical specification values of the exposure mask are values relating to a dimension of the exposure mask, relating to a transmissivity or phase difference in the case of a phase shift mask used as the exposure mask, relating to a mask defect of the exposure mask, relating to a mask pattern depicting error of the exposure mask, or a combination of at least one of the dimension of the exposure mask, transmissivity or phase difference in the case of a phase shift mask used as the exposure mask, mask defect of the exposure mask and mask pattern depicting error of the exposure mask.

5. The method according to claim 1, wherein a window of allowable values of dimensional fluctuations on the substrate to be processed in the lithography process is calculated in the step of calculating the window of lithography process on the substrate to be processed.

6. The method according to claim 5, wherein a window of process fluctuation in the lithography process is calculated as the window of the allowable values of dimensional fluctuations on the substrate to be processed in the lithography process.

7. The method of claim 6, wherein at least one of focus fluctuation and exposure fluctuation is used as the process fluctuation in the lithography process.

8. A method of manufacturing an exposure mask comprising the following steps:

calculating a window of lithography process on a substrate to be processed, the window being calculated at least in a partial data of a design data for designing a circuit pattern of an integrated circuit, and the window also being calculated in consideration of first physical specification values of the exposure mask for use in transfer of the circuit pattern;

comparing the calculated window of lithography process and an actually required window of lithography process on the substrate to be processed;

revising the first physical specification values in response to said comparing and the calculated window of lithography process being smaller than the actually required window of lithography process, the first physical specification values being revised such that a window of lithography process on the substrate to be processed is equal to or larger than the actually required window of lithography process;

setting second physical specification values, the second physical specification values being set by updating the first physical specification values; and forming a mask pattern for transferring the circuit pattern on the exposure mask, wherein the mask pattern is formed on the basis of the second physical specification values.

9. The method according to claim 8, wherein the operation from the step of calculating the window of lithography process on the substrate to be processed to the step of revising the first physical specification values is executed on all data of the design data in every partial data.

10. The method according to claim 8, wherein the step of calculating the window of lithography process on a substrate to be processed and the step of comparing the calculated window of lithography process and the actually required window of lithography process on the substrate to be processed are executed in batch on all data of the design data, if the batch calculated window of lithography process includes a portion smaller than the required window of lithography process, the physical specification values corresponding to this small portion are detected from the first physical specification values, and the physical specification values are changed such that the window of lithography process on the substrate with respect to the detected physical specification values are equal to or larger than the actually required window of lithography process.

11. The method according to claim 8, wherein, as the first and second physical specification values of the exposure mask, values relating to a dimension of the exposure mask, relating to a transmissivity or phase difference in the case of a phase shift mask used as the exposure mask, relating to mask defect of the exposure mask, relating to a mask pattern depicting error of the exposure mask, or a combination of some of them are used.

12. The method according to claim 8, wherein a window of allowable values of dimensional fluctuations on the substrate to be processed in the lithography process is calculated in the step of calculating the window of lithography process on the substrate to be processed.

13. The method according to claim 12, wherein a window of process fluctuation in the lithography process is calculated as the window of allowable values of dimensional fluctuations on the substrate to be processed in the lithography process.

14. The method according to claim 13, wherein at least one of focus fluctuation and exposure fluctuation is used as the process fluctuation in the lithography process.

15. An exposure mask comprising:

a mask pattern of a circuit pattern of an integrated circuit designed by a method of designing a pattern of the integrated circuit, formed on the exposure mask, the method of designing a pattern of the integrated circuit comprising:

calculating a window of lithography process on a substrate to be processed, the window being calculated at least in a partial data of a first design data for designing the circuit pattern of the integrated circuit, and the window also being calculated in consideration of physical specification values of the exposure mask for use in transfer of the circuit pattern;

comparing the calculated window of lithography process and an actually required window of lithography process on the substrate to be processed;

revising the partial data in response to said comparing and the calculated window of lithography process being smaller than the actually required window of lithography process, the partial data being revised such that the window of lithography process on the substrate to be processed is equal to or larger than the actually required window of lithography process; and preparing a second design data, wherein the second design data is prepared by updating the first design data by using the revised partial data.

16. An exposure mask comprising:

a mask pattern being formed by a method of manufacturing an exposure mask, the method of manufacturing the exposure mask comprising:

calculating a window of lithography process on a substrate to be processed, the window being calculated at least in a partial data of a design data for designing a circuit pattern of an integrated circuit, and the window also being calculated in consideration of first physical specification values of the exposure mask for use in transfer of the circuit pattern;

comparing the calculated window of lithography process and an actually required window of lithography process on the substrate to be processed;

revising the first physical specification values in response to said comparing and the calculated window of lithography process being smaller than the actually required window of lithography process, the first physical specification values being revised such that a window of lithography process on the substrate to be processed is equal to or larger than the actually required window of lithography process;

setting second physical specification values, the second physical specification values being set by updating the first physical specification values; and forming the mask pattern for transferring the circuit pattern on the exposure mask, wherein the mask pattern is formed on the basis of the second physical specification values.

17. A method of manufacturing an integrated circuit device comprising:

a lithography process for transferring a pattern by using an exposure mask, the exposure mask having a mask pattern of a circuit pattern of the integrated circuit formed thereon, being designed by a method of designing the pattern of the integrated circuit, the method of designing the pattern of the integrated circuit comprising:

calculating a window of lithography process on a substrate to be processed, the window being calculated at least in a partial data of a first design data for designing the circuit pattern of the integrated circuit, and the window also being calculated in consideration of physical specification values of an exposure mask for use in transfer of the circuit pattern;

comparing the calculated window of lithography process and an actually required window of lithography process on the substrate;

revising the partial data in response to said comparing and the calculated window of lithography process being smaller than the actually required window of lithography process, the partial data being revised such that the window of lithography process on the substrate to be processed is equal to or larger than the actually required window of lithography process; and preparing second design data, wherein the second design data is prepared by updating the first design data by using the revised partial data.

18. A method of manufacturing an integrated circuit device comprising:

a lithography process for transferring a circuit pattern by using an exposure mask, the exposure mask having a mask pattern formed thereon by a method of manufacturing an exposure mask, the method of manufacturing an exposure mask comprising:

calculating a window of lithography process on a substrate to be processed, the window being calculated at least in a partial data of a design data for designing the circuit pattern of the integrated circuit, and the window also being calculated in consideration of first physical specification values of an exposure mask for use in transfer of the circuit pattern;

comparing the window of lithography process being calculated and an actually required window of lithography process on the substrate;

revising the first physical specification values in response to said comparing and the calculated window of lithography process being smaller than the actually required window of lithography process, the first physical specification values being revised such that a window of lithography process on the substrate to be processed is equal to or larger than the actually required window of lithography process;

setting second physical specification values, the second physical specification values being set by updating the first physical specification values by using the revised physical specification values; and forming a mask pattern for transferring the circuit pattern on the exposure mask, wherein the mask pattern is formed on the basis of the second physical specification values.

* * * * *